(12) United States Patent
Hecht et al.

(10) Patent No.: US 6,439,580 B1
(45) Date of Patent: Aug. 27, 2002

(54) SEALING ELEMENT FOR PIPELINES

(75) Inventors: Reinhard Hecht; Karl Manstorfer, both of Maximilianstrasse 14, D-93047 Regensburg (DE)

(73) Assignees: Reinhard Hecht; Karl Manstorfer, both of Regensburg (DE); Ka-Te System AG, Zurich (CH)

( * ) Notice: Subject to any disclaimer, the term of this patent is extended or adjusted under 35 U.S.C. 154(b) by 0 days.

(21) Appl. No.: 09/647,244

(22) PCT Filed: Mar. 30, 1999

(86) PCT No.: PCT/IB99/00564
§ 371 (c)(1),
(2), (4) Date: Nov. 24, 2000

(87) PCT Pub. No.: WO99/53233
PCT Pub. Date: Oct. 21, 1999

(30) Foreign Application Priority Data

Apr. 9, 1998 (DE) ..................... 298 06 603 U

(51) Int. Cl.⁷ ............... F16L 21/02; F16L 17/00; F16L 55/10; F16L 55/12; F16J 15/08
(52) U.S. Cl. ............. 277/605; 277/627; 277/904; 285/10; 285/97; 285/909; 285/109; 285/214; 138/89; 138/93
(58) Field of Search .................. 277/605, 627, 277/650, 904; 285/10, 97, 909, 100, 109, 214; 138/89, 93

(56) References Cited

U.S. PATENT DOCUMENTS

| | | | |
|---|---|---|---|
| 4,013,097 A | | 3/1977 | Calandra |
| 4,315,703 A | * | 2/1982 | Gasper ................ 405/264 |
| 4,346,922 A | * | 8/1982 | Ohtsuga et al. ............ 285/109 |
| 4,993,722 A | | 2/1991 | Gundy |
| 5,027,895 A | * | 7/1991 | Barton ................... 166/186 |
| 5,035,539 A | * | 7/1991 | Kawafuji et al. ......... 405/184.2 |
| 5,049,003 A | * | 9/1991 | Barton .................. 405/184.1 |
| 5,351,720 A | * | 10/1994 | Maimets ................... 138/98 |
| 5,557,073 A | * | 9/1996 | Truesdale et al. ........... 156/293 |
| 5,607,167 A | * | 3/1997 | Franckx ................... 277/612 |
| 5,775,702 A | * | 7/1998 | Laeremans et al. ......... 277/314 |

FOREIGN PATENT DOCUMENTS

| | | |
|---|---|---|
| DE | 37 16 918 A1 | 12/1988 |
| DE | 38 16 573 A1 | 11/1989 |
| DE | 297 20 570 U1 | 3/1998 |
| EP | 0 290 995 B1 | 11/1988 |
| EP | 0 300 169 B1 | 1/1989 |
| EP | 0 372 963 A1 | 6/1990 |
| EP | 0 467 077 A1 | 1/1992 |
| EP | 0 537 052 A1 | 4/1993 |
| EP | 0 695 906 A1 | 2/1996 |
| EP | 0 732 532 A2 | 9/1996 |
| FR | 2 677 428 A1 | 12/1992 |
| FR | 2 682 452 A1 | 4/1993 |
| GB | 2 056 012 A | 3/1981 |
| GB | 2 254 669 A | 10/1992 |
| WO | WO 97/35127 | 9/1997 |

* cited by examiner

Primary Examiner—Anthony Knight
Assistant Examiner—Vishal Patel
(74) Attorney, Agent, or Firm—Oliff & Berridge, PLC

(57) ABSTRACT

The invention relates to a sealing element (1) with inflatable bellows (10) for sealing piping. Said sealing element can be e.g. cylindrical in shape and said bellows (10) can be provided with two recesses (14a, 14b) containing a gel (11). When the bellows are inflated, the gel (11) encompasses e.g. uneven areas on the inner wall of the piper or cables in the pipe in such a way as to provide a seal.

18 Claims, 3 Drawing Sheets

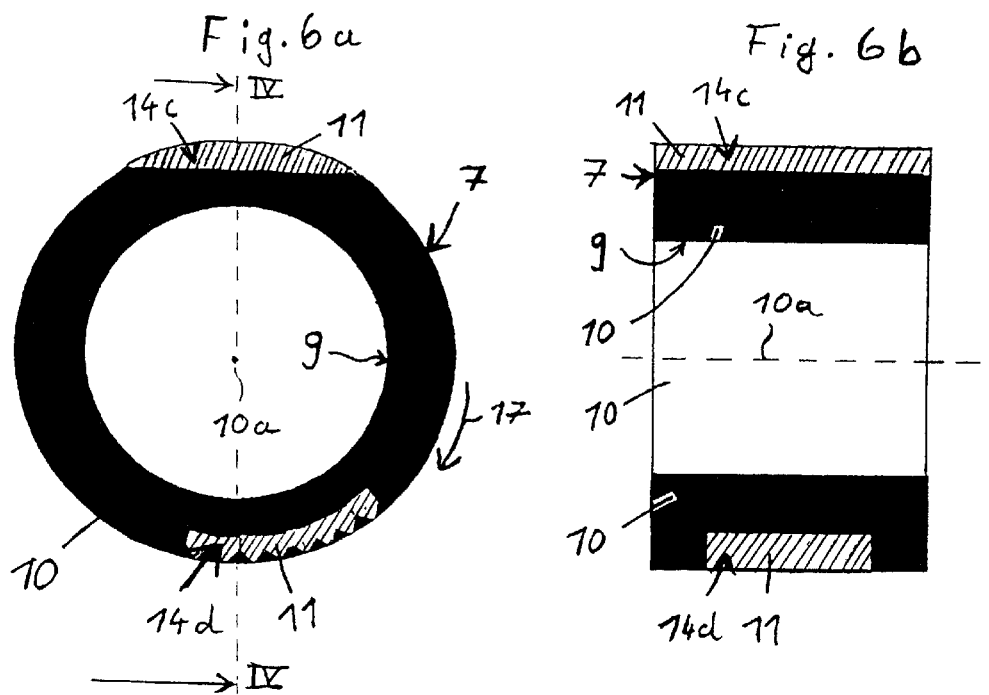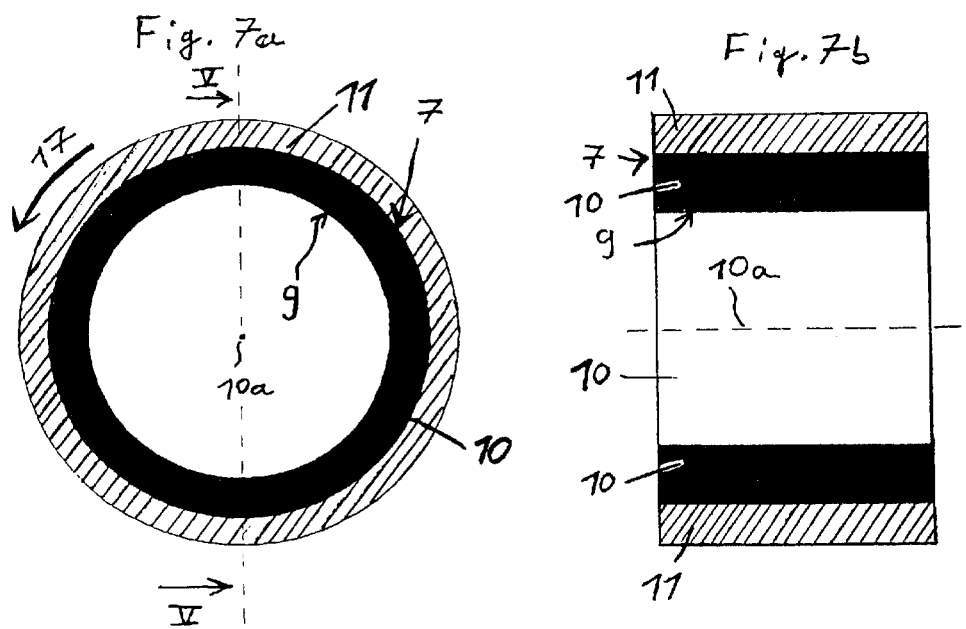

SEALING ELEMENT FOR PIPELINES

The invention relates to a sealing element for sealing pipelines, having an inflatable bellows which in the inflated state causes the sealing element to bear against an inner wall of the pipeline.

Such sealing elements are also known as "pipe sealing pads" or "plug bags" and have a wide variety of possible uses. They are used, for example, for pipe and drain plugs, for leakage tests, measurements of flow rate and in many other sectors. In this case, the sealing element is put into the pipeline and inflated, in the course of which the outer sleeve of the bellows comes into contact with the inner wall of the pipeline and thereby ensures sealing.

The sealing elements known from practice are obtainable for various pipe diameters. However, the known sealing elements can only satisfactorily seal clean and smooth inner-wall surfaces of pipelines. In the event of impurities, unevenness or damage to the pipelines, pressure-tight, reliable sealing often cannot be achieved.

Communication cables or conduits with cables have started to be laid in drainage channels, and these communication cables or conduits do not permit the use of the conventional sealing elements, since the sealing elements are not flexible enough to seal the cavity between cables or conduits and pipe inner wall.

A separate segment piece which has appropriate recessed portions for the laid cables or leads has therefore been provided in DE-U-297 20 570. This segment piece is adapted to the diameter of the pipeline and is made of elastic material, which is arranged between the pipe inner wall and a pipe sealing pad.

However, this sealing system does not take into account the problems associated with any impurities, unevenness or damage to the pipe wall. Furthermore, this sealing system can only be attached at locations accessible by hand. The sealing of a pipe section which is not accessible from the shafts is not possible. Furthermore, a relatively large amount of time is required in order to make the seal, so that this sealing system is unsuitable for rapid use in the event of an accident. Furthermore, the segment pieces must be adapted to the cables and conduits laid in the pipeline in order to ensure sealing which is as effective as possible.

The object of the invention is therefore to specify a sealing element for sealing pipelines according to the preamble of Claim 1 which on the one hand is easy to manipulate and on the other hand ensures reliable sealing even in pipelines with cables and/or conduits.

This object is achieved according to the invention by the features of Claim 1 in that, on its outer side bearing against the inner wall of the pipeline, at least on sections of its circumference, the sealing element has a dimensionally stable, easily deformable gel which in the inflated state of the bellows comes into sealing contact with the inner wall of the pipeline.

The gel used is a gel having crosslinked molecules, form memory and good, reaction-free flow behavior under compression. The cohesion forces of the molecules in this gel are greater than the adhesion forces of the molecules relative to, for example, the inner wall of the pipeline or relative to cables laid in the pipe. Firstly, cavities, e.g. between unevenness and cables, can be filled in a sealing manner with such a gel. On the other hand, such a gel ensures that the sealing element can be removed again from the inner wall of the pipeline without problems, the gel returning without great wear into its initial state, so that the sealing element can be fitted and removed many times.

Further developments of the invention are the subject matter of the subclaims.

In an especially preferred embodiment, the bellows has the gel on its entire outer side facing the inner wall of the pipeline. This is especially advantageous if, for example, older pipelines having very uneven inner walls due to deposits and/or corrosion are to be sealed.

In a further preferred embodiment, the bellows of the sealing element is cylindrical and has a recess which extends in a ring shape in the circumferential direction and contains the gel.

Further advantages and developments of the invention are explained in more detail with reference to the description of various embodiments shown in the following figures.

In the figures, in schematic representation:

FIG. 6a shows a ring-shaped bellows of a sealing element having a recess designed in the form of a segment-like cutout and containing gel and a recess designed in the form of a groove and containing gel;

FIG. 6b shows a section through the bellows of the sealing element shown in FIG. 6a along the section line IV—IV;

FIG. 7a shows a ring-shaped bellows of a sealing element with gel over its entire outer side facing the inner wall of the pipeline; and FIG. 7b shows a section through the bellows of the sealing element shown in FIG. 7a along the section line V—V.

Figure 1:
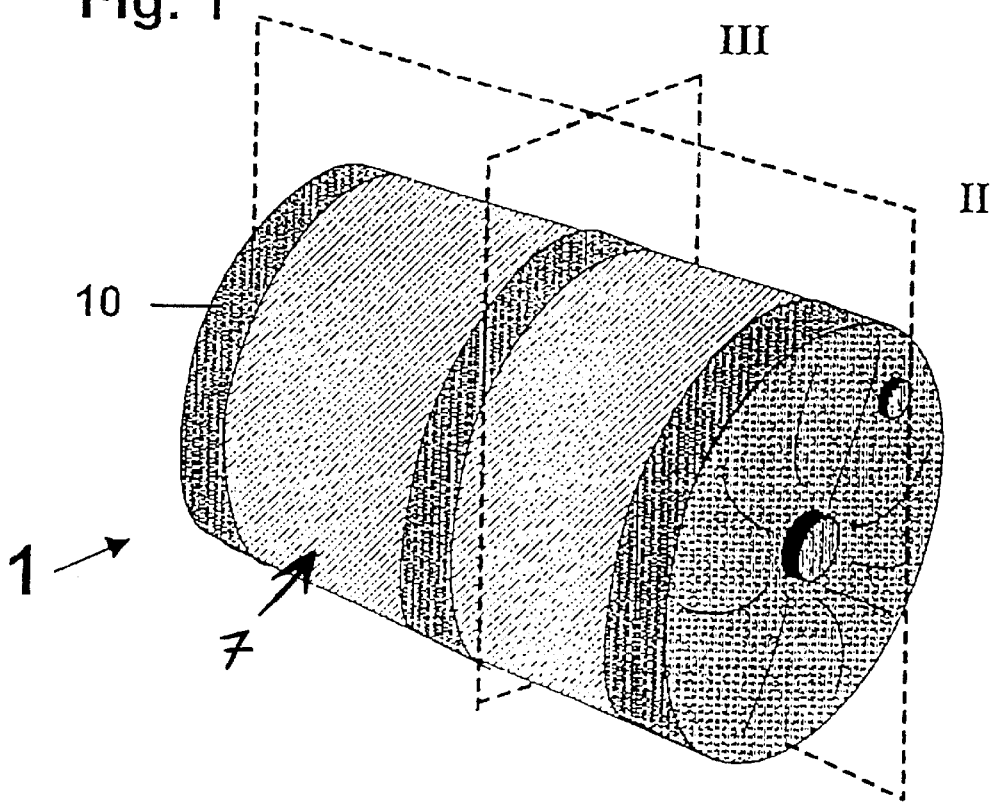
FIG. 1 shows a three-dimensional, perspective view of a sealing element according to the invention.
Figure 2:
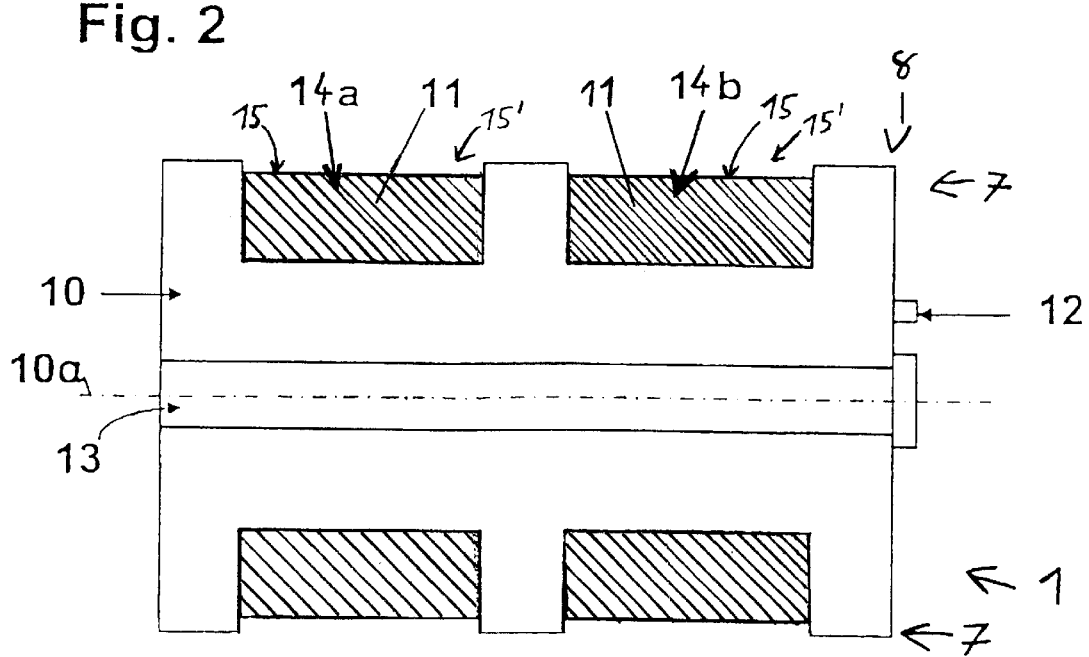
FIG. 2 shows a longitudinal section along section plane II in FIG. 1.

The sealing element 1 shown in FIGS. 1 to 4 for sealing pipelines 2 has an inflatable bellows 10 which bears in the inflated state against an inner wall 2a of a pipeline 2. On its outer side 7 facing the inner wall 2a of the pipeline 2, the bellows 10 has at least one recess 14a, which contains a dimensionally stable, easily deformable gel 11, which in the inflated state of the bellows 10 likewise comes into contact with the inner wall 2a of the pipeline 2 (see FIG. 4).

The bellows 10 is of essentially cylindrical design and has an air valve 12 on one end face 8, via which air valve 12 the bellows 10 is inflated. Furthermore, the bellows 10 is provided with a throughflow line 13 in order to permit, for example, a metered discharge of liquid from a plugged pipeline section 6 (cf. FIG. 5).

In the exemplary embodiment shown, the recess 14a is designed in a ring shape around the longitudinal axis 10a of the bellows. However, at least two recesses 14a, 14b are preferably provided, and these recesses are at a distance from one another in the direction of the longitudinal axis 10a. In the exemplary embodiment shown, a second recess 14b, which likewise contains the gel 11, is provided.

Figure 4:
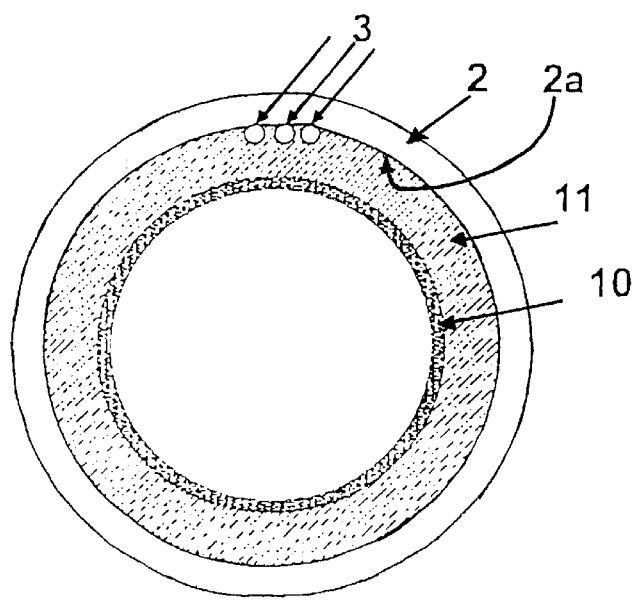
FIG. 4 shows the sealing element from FIG. 1 put into a pipeline in a section transversely to the longitudinal axis of the pipe.

So that the gel 11 can fully develop its sealing effect, the recesses 14a, 14b are designed in such a way that they limit the gel 11 on all sides except for the side 15' facing the pipe inner wall 2a, in order thus to prevent the gel from being pushed away laterally. During the inflation of the bellows 10, the easily deformable gel 11 fills up any unevenness and damage on the inner wall 2a of the pipe 2 and encloses, for instance, any cables 3, as shown in FIG. 4.

Figure 3:
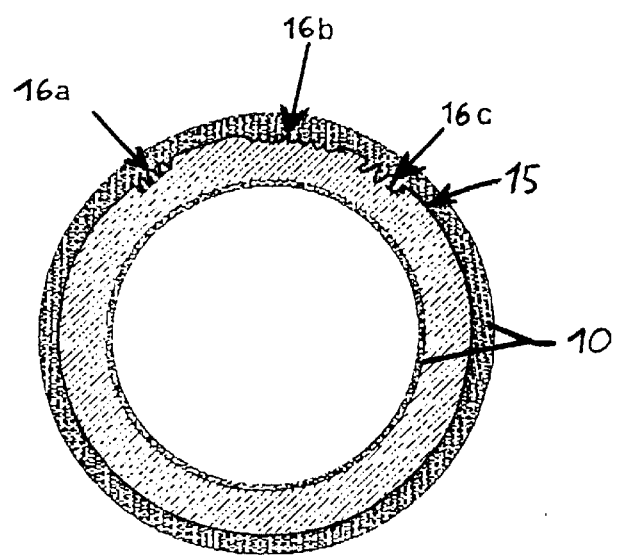
FIG. 3 shows a cross section along section plane III in FIG. 1.

The gel 11 is dimensionally stable, so that it assumes its original shape again after the air is let out of the bellows 10. To improve the sealing in the region of cables 3 which are laid on the inner wall 2a of the pipeline 2, it is especially advantageous if the surface 15 of the gel 11 which faces the inner wall 2a is designed to be profiled. In FIG. 3, three different profiled forms 16a, 16b and 16c are shown by way of example. In these examples, the surface 15 of the gel 11 is in each case profiled in the longitudinal direction, i.e. in the direction of the longitudinal axis 10a of the bellows 10, in order thus to ensure that the cables 3, which are likewise laid in the longitudinal direction, are enclosed as effectively as possible.

The surface profile 16a is of essentially serrated design, the surface profile 16b is more of a channel-shaped design, and the surface profile 16c is of slit design. Within the scope of the invention, other profiled surface forms 16 are of course also conceivable and even a smooth surface 15 ensures reliable sealing.

Figure 5:
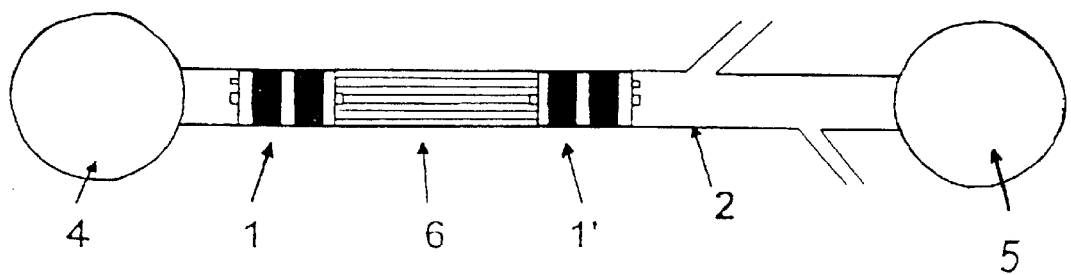
FIG. 5 shows two sealing elements as shown in FIG. 1 in use in a pipeline.

A practical application for sealing elements 1 according to the invention is shown schematically in FIG. 5. In the example shown, sealing elements 1, 1' of the type described above are in use. A section 6 of a pipeline 2 running between two shafts 4, 5 is to be examined. To this end, sealing elements 1, 1' are inserted into the pipeline 2. After the two sealing elements 1, 1' have been inflated, the region 6 of the pipeline 2 can be examined unhindered.

Shown in FIGS. 6a, 6b and 7a, 7b is in each case a ring-shaped bellows 10 of a sealing element 1 whose outer side 7 facing the inner wall 2 and an inner side 9 are designed in the shape of a circle in cross section.

On its outer side 7, the bellows shown in FIGS. 6a and 6b has a flat 14c and a recess 14d in the form of a groove, which are each filled with the gel 11 and are limited in the direction of the circumference 17. The recess 14d in the form of a groove permits the use of a number of different gels 11. The flat 14c permits very simple production and can be formed wherever the outer side 7 of the bellows 10 has rounded portions as viewed in cross section, i.e. circle segments, ovals, egg shapes, etc. In general, flats 14c and recesses 14d as shown here may be unlimited in the direction of the longitudinal axis 10a of the bellows 10, which makes it especially suitable for use in pipelines with laid cables 3 or leads. The flats 14c and the recesses 14d need only be adapted in their extension in the circumferential direction 17 and in their arrangement on the outer side 7 of the bellows 10 to the position of the cables on the inner wall 2a of the pipeline 2.

In FIGS. 7a and 7b, the outer side 7 of the bellows 10 has no special recesses 14 for the gel 11, but rather the entire outer side 7 is provided with the gel 11. Applying the gel to the bellows in this way is very simple and cost-effective in production and permits versatile use of the sealing element 1 having such a bellows 10.

Depending on the intended place of use, the outer side 7 of the bellows 10 may be shaped, i.e. not only the egg, oval and cylindrical shapes already mentioned, but also rectangular and other polygonal shapes as viewed in cross section as well as mixed shapes with corners and rounded portions. The same also applies in the case of ring-shaped bellows 10 for the inner side 9 of the bellows 10, in which case the inner side 9 and the outer side 7 do not need to have the same shape in cross section, as in the examples shown in FIGS. 6a to 7b.

The gels 11 used may be thermoplastic gels 11 containing paraffin oil, as offered, for example, by Raychem as S1242, S1269, S1274 or S1294.

The special advantages of the sealing element 1, 1' according to the invention lie on the one hand in the reliable sealing of pipelines 2, even if these have contaminants, impurities or damage or even laid cables 3, and on the other hand in the fact that, due to the one-piece design, it is possible to attach the sealing elements 1, 1' even at locations which are not accessible by hand, the sealing elements 1, 1' being drawn in in a manner known per se.

What is claimed is:

1. A sealing element for sealing pipelines, the sealing element having an inflatable bellows which, in an inflated state, causes the sealing element to bear against an inner wall of the pipeline, wherein, on an outer side of the bellows facing an inner wall of the pipeline, at least on sections of a circumference of the bellows, the bellows carries a dimensionally stable, easily deformable gel forming part of the sealing element which, in an inflated state of the bellows, comes into direct sealing contact with the inner wall of the pipeline and which, in a deflated state of the bellows, returns to an original form of the gel on the bellows.

2. The sealing element according to claim 1, wherein the gel is profiled on a surface coming into contact with the inner wall of the pipeline in a direction of a longitudinal axis of the bellows.

3. The sealing element according to claim 1, wherein the bellows has a throughflow line.

4. The sealing element according to claim 1, wherein the bellows is designed in a ring shape having an inner side and that can be shaped differently in cross section than the outer side of the bellows.

5. The sealing element according to claim 1, wherein the bellows is of an approximately cylindrical design and preferably has an air valve on an end face of the bellows.

6. The sealing element according to claim 1, wherein the bellows bears at least partly against the inner wall of the pipeline when the bellows is in the inflated state.

7. The sealing element according to claim 1, wherein the bellows has at least one recess, in which the gel is arranged, on the outer side of the bellows facing the inner wall of the pipeline.

8. The sealing element according to claim 7, wherein the at least one recess of the bellows extends in a circumferential direction and is preferably closed in a ring shape.

9. The sealing element according to claim 8, wherein the bellows has at least two recesses at a distance from one another in the longitudinal direction of the bellows.

10. The sealing element according to claim 7, wherein each of the at least one recess extends in the longitudinal direction, preferably over an entire length of the bellows.

11. The sealing element according to claim 10, wherein each of the at least one recess extends approximately parallel to the longitudinal axis of the bellows.

12. The sealing element according to claim 10, wherein the bellows has at least two recesses at a distance from one another in a circumferential direction.

13. The sealing element according to claim 10, wherein the at least one recess is in the form of a groove.

14. The sealing element according to claim 14, wherein, in cross section, the bellows is essentially one of a circle, an oval or an egg shape with respect to the outer side of the bellows.

15. The sealing element according to claim 14, wherein the bellows has at least one flat on the outer side of the bellows, and the gel is arranged in a region of the flat.

16. The sealing element according to claim 7, wherein each recess and flat is limited in the circumferential direction and in the longitudinal direction of the bellows.

17. The sealing element according to claim 1, wherein an entire outer side of the bellows, facing the inner wall of the pipeline, has the gel.

18. The sealing element according to claim 1, wherein the gel is distinguished by shape memory and by cohesion forces exceeding any adhesion forces and is a thermoplastic gel containing paraffin oil.

* * * * *